W. TAFT.
HELICOPTER.
APPLICATION FILED AUG. 20, 1920.
1,373,775.
Patented Apr. 5, 1921.
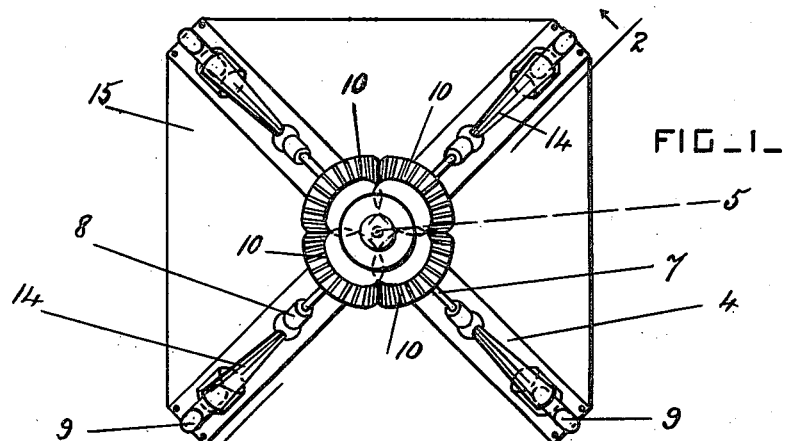
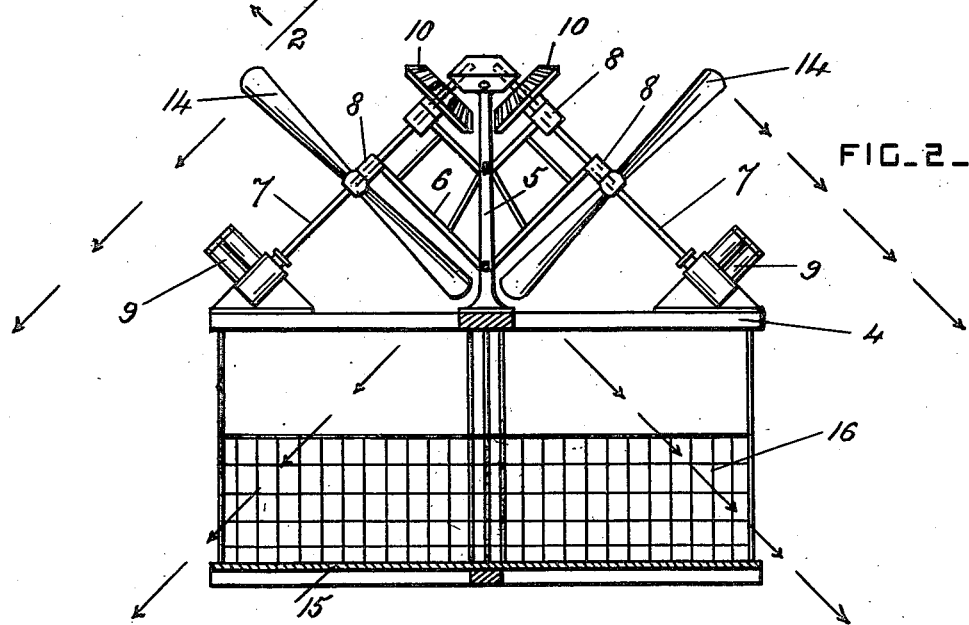
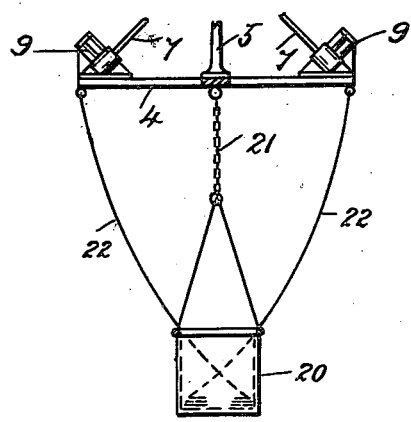

UNITED STATES PATENT OFFICE.

WALTER TAFT, OF WILMINGTON, NORTH CAROLINA.

HELICOPTER.

1,373,775.    Specification of Letters Patent.    Patented Apr. 5, 1921.

Application filed August 20, 1920. Serial No. 404,784.

*To all whom it may concern:*

Be it known that I, WALTER TAFT, a citizen of the United States, residing at Wilmington, in the county of New Hanover and State of North Carolina, have invented certain new and useful Improvements in Helicopters, of which the following is a specification.

This invention relates to helicopters for traveling through the atmosphere; and it consists in the novel construction and combination of the parts hereinafter fully described and claimed.

In the drawings, Figure 1 is a plan view of a helicopter constructed according to this invention. Fig. 2 is a vertical section taken diagonally through the helicopter on the line 2—2 in Fig. 1. Fig. 3 is a side view of the lower part of the frame of the helicopter, drawn to a smaller scale, and showing a basket suspended from it and means for steering the helicopter operated from the basket.

A frame is provided and its base portion 4 is arranged horizontally, and in the example shown it is made in the form of a cross having arms which radiate from a center. An upright 5 is secured at the center of the frame. The frame may however be formed in any other approved manner, and may have any desired number of radial arms which will balance each other around its center of gravity.

The upright 5 of the frame is provided with suitable supports 6 for shaft bearings 8, and driving shafts 7 are journaled in the bearings 8. These driving shafts are inclined downwardly and outwardly from a central point above the top of the upright, and they are driven by motors 9. The motors are of any approved construction, and they are preferably secured to the outer end portions of the arms of the base of the frame. Each driving shaft is preferably provided with a separate motor. Intermeshing bevel gears or bevel wheels 10 are secured to the upper end portions of the shafts 7, and are geared together, so that the shafts all revolve simultaneously. If any one motor should fail to act, its shaft is driven by the remaining motors. Propellers 14 having inclined blades are secured on the shafts 7, and are preferably arranged about midway between the motors and the bevel gears or wheels 10. The shafts 7 are arranged at substantially an angle of 45° with the normal vertical axis of the upright 5 of the frame, which axis is intersected by their axes. An even number of shafts 7 is provided, and they are preferably arranged symmetrically and at equal distances apart around the said axis.

The shafts 7 are directly connected together by the bevel gears, and, when four shafts are provided, two of them revolve in one direction and two in the reverse direction. Each two shafts, which are arranged diametrically opposite to each other, form a pair and are revolved in the same direction. This motion of the shafts and of the propellers enables the helicopter to fly straight and to rise freely in the air. The number of shafts and propellers may be increased, provided one-half of them are revolved in one direction and the other half in the reverse direction, so that the twisting motions of the blast currents are equalized.

A platform 15 is secured rigidly below the base 4 of the frame, and it is preferably the bottom of a wire cage 16, but may be connected to the frame in any other way which will not interfere with the downward currents of air from the propellers, which currents are indicated by the arrows in Fig. 2. The platform 15 is arranged at such a distance below the base of the frame, and is proportioned and constructed so that it will not obstruct or interfere with the blast of air driven off by each propeller.

The helicopter is raised in the air by the action of the propellers which are revolved at a suitable speed by the motors. The helicopter is steered by changing its center of gravity so as to tilt its upright 5 from its normally vertical position. This is accomplished by the operator who stands on the platform, and who changes his position thereon, so as to move the weight of his body, or any other weight under his control, into a different position and thereby tilt the upright 5 more or less in any desired direction.

In Fig. 3 an alternative means for steering the helicopter is shown. A basket 20, or similar support, is suspended from the frame by flexible connections or cords 21, and cords 22 or other similar operating devices are secured at various points to the outer parts of the frame, and are operated by the man in the basket. The man pulls upon one or the other of the cords 22 so as to move the basket and his own body relative to the frame, thereby changing the center of gravity of the helicopter and tilting the upright 5 from its normally vertical position.

What I claim is:

1. In a helicopter, a frame, driving shafts journaled in the frame, said shafts being arranged symmetrically around a normally vertical axis and inclined downwardly and outwardly, propellers secured on the said shafts, and means for driving each alternate shaft simultaneously in one direction and the remaining shafts simultaneously in the reverse direction.

2. In a helicopter, a frame, driving shafts arranged in pairs around a normally vertical axis, said shafts being inclined downwardly and outwardly, and the shafts of each pair being arranged on opposite sides of the said axis, propellers secured on the said shafts, and means for driving each alternate shaft simultaneously in one direction and the remainder simultaneously in the reverse direction, the shafts of each pair being driven in the same direction.

3. In a helicopter, a frame, pairs of driving shafts arranged around a normally vertical axis, said shafts being inclined downwardly and outwardly and the shafts of each pair being arranged on opposite sides of the said axis, propellers secured on the said shafts, and means for driving each alternate pair of shafts simultaneously in a different direction from the remaining pairs.

4. In a helicopter, a frame, pairs of propellers journaled in the frame and arranged symmetrically around a normally vertical axis with their axes inclined thereto, and means for revolving each alternate pair of propellers in a different direction from the remaining pairs.

5. In a helicopter, a frame, driving shafts journaled in the frame, said shafts being arranged symmetrically around a normally vertical axis and inclined downwardly and outwardly, bevel gears secured on the upper end portions of the said shafts and geared together so that one half of the shafts revolve in one direction and the other half in the reverse direction, propellers secured on the said shafts, and means for driving all the shafts simultaneously.

6. In a helicopter, a frame, four driving shafts journaled in the frame and arranged symmetrically around a normally vertical axis with their axes inclined thereto, bevel gears secured on the upper end portions of the said shafts and geared together so that two alternate shafts are constrained to revolve simultaneously in one direction and the remaining two in the reverse direction, a separate motor connected to the lower end portion of each said shaft, and a propeller secured on the middle portion of each said shaft.

7. In a helicopter, a frame, pairs of propellers journaled in the frame and arranged symmetrically around a normally vertical axis with their axes inclined thereto, means for revolving each alternate pair of propellers in a different direction from the remaining pairs, and a support for the aviator suspended from the said frame and arranged in the central space between the blast currents of the propellers.

In testimony whereof I have affixed my signature.

WALTER TAFT.